United States Patent
Lee

(10) Patent No.: US 11,159,734 B2
(45) Date of Patent: Oct. 26, 2021

(54) AUTOMATIC OBJECT TRACKING SYSTEM AND AUTOMATIC OBJECT TRACKING METHOD

(71) Applicant: HEIMAVISTA INC., Taipei (TW)

(72) Inventor: Ching-Kang Lee, Taipei (TW)

(73) Assignee: HEIMAVISTA INC., Taipei (TW)

( * ) Notice: Subject to any disclaimer, the term of this patent is extended or adjusted under 35 U.S.C. 154(b) by 0 days.

(21) Appl. No.: 16/917,025

(22) Filed: Jun. 30, 2020

(65) Prior Publication Data

US 2020/0336671 A1     Oct. 22, 2020

Related U.S. Application Data

(63) Continuation-in-part of application No. 16/212,367, filed on Dec. 6, 2018, now Pat. No. 10,855,926.

(51) Int. Cl.
| | |
|---|---|
| *H04N 5/232* | (2006.01) |
| *G03B 17/56* | (2021.01) |
| *G06T 7/50* | (2017.01) |
| *G06T 7/246* | (2017.01) |

(52) U.S. Cl.
CPC ....... *H04N 5/23299* (2018.08); *G03B 17/561* (2013.01); *G06T 7/246* (2017.01); *G06T 7/50* (2017.01); *H04N 5/23218* (2018.08)

(58) Field of Classification Search
None
See application file for complete search history.

(56) References Cited

U.S. PATENT DOCUMENTS

| | | | |
|---|---|---|---|
| 2018/0352144 A1* | 12/2018 | Miao | G01S 15/66 |
| 2019/0096069 A1* | 3/2019 | Qian | G06T 7/74 |
| 2019/0162358 A1* | 5/2019 | Wang | F16M 11/205 |

OTHER PUBLICATIONS

DJI's OSMO Mobile, https://www.youtube.com/watch?v=bSihyp3Hy6g (Feb. 9, 2018).*
DJI's OSMO Mobile https://www.youtube.com/watch?v=7fWe1o2RjZY (Jan. 8, 2018).*
DJI, https://www.youtube.com/watch?v=m9OgFn-FtAY (May 9, 2018).*
https://www.youtube.com/watch?v=ROmyVcavDik (Jan. 15, 2018).*
https://www.youtube.com/watch?v=G9zR4z5Lo_w (Sep. 1, 2016).*

* cited by examiner

Primary Examiner — Michael J Hess
(74) Attorney, Agent, or Firm — Rabin & Berdo, P.C.

(57) ABSTRACT

An automatic object tracking system is configured to perform an automatic object tracking method. A horizontal coordinate axis and a vertical coordinate axis are defined in image capturing data captured by a handheld device. When a feature object is recognized, a sampling frame is set to surround the feature object, and a reference point is set within the sampling frame. A horizontal distance and a vertical distance from the reference point to a target coordinate are calculated. When the horizontal distance or the vertical distance is larger than a horizontal threshold, a turning command is issued to move the reference point towards the target coordinate horizontally or vertically by at least one horizontal unit or by at least one vertical unit. In case that plural feature objects are recognized, the handheld mobile device chooses a proper one of the plural feature objects timely to perform the panning shot.

8 Claims, 16 Drawing Sheets

AUTOMATIC OBJECT TRACKING SYSTEM AND AUTOMATIC OBJECT TRACKING METHOD

CROSS-REFERENCE TO RELATED APPLICATIONS

This patent application is a continuation-in-part application of non-provisional application Ser. No. 16/212,367 filed on Dec. 6, 2018, the disclosure of which is incorporated herein in its entirety by reference.

BACKGROUND

Technical Field

This disclosure relates to panning shot, and in particular, to an automatic object tracking system and an automatic object tracking method.

Related Art

When a user takes a selfie with a smartphone, in a conventional manner, similar to a camera, the smartphone is fixed by using a tripod or a fixing support in another form, and timed photographing or video recording is started. In this case, the smartphone is completely fixed, and the user can move in only a very small range to ensure that the user is photographed. Another tool is a selfie stick. A handle stick is used in place of a tripod, and a mechanism (a wired or wireless connection mechanism) that can actuate a shutter is provided. The user holds the stick to take a selfie. However, an imaging distance is limited by the length of the stick, and a selfie can only be taken at a short distance.

Currently, several panning shot technologies have been developed, however, excessive panning of this type of tracking dock causes a smartphone to continuously swivel to track the specific object. As a result, image capturing data (especially a dynamic video stream) is obviously shaky. Therefore, a tracking manner still needs to be improved.

SUMMARY

In view of the problems, this disclosure proposes an automatic object tracking system and an automatic object tracking method, to resolve the problem that image capturing data is shaky due to excessive tracking of a specific object.

This disclosure proposes an automatic object tracking system, including a handheld mobile device and a tracking dock.

The handheld mobile device includes: a microprocessor, configured to perform an object tracking mode; an image capturing unit, electrically connected to the microprocessor, and configured to capture image capturing data in an image capturing direction and transfer the image capturing data to the microprocessor; wherein the microprocessor defines a horizontal coordinate axis and a vertical coordinate axis perpendicular to each other in the image capturing data, defines a length of the image capturing data along the horizontal coordinate axis into a plurality of horizontal units, and defines a height of the image capturing data with respect to the horizontal coordinate axis into a plurality of vertical units; a memory unit, electrically connected to the microprocessor, and configured to store the image capturing data; a touch-control display panel, electrically connected to the microprocessor, and configured to display the image capturing data, receive a touch control operation, and feedback the touch control operation to the microprocessor; and a first communication interface, electrically connected to the microprocessor.

The tracking dock includes a controller; a second communication interface, electrically connected to the controller, and configured to establish a communication link to the first communication interface to receive a panning command and transfer the panning command to the controller; and a turning module, electrically connected to the controller, and configured to support the handheld mobile device; wherein the controller drives the turning module according to the panning command to turn, to change the image capturing direction of the image capturing unit.

Wherein in the object tracking mode, the microprocessor recognizes a feature object from the image capturing data, sets a sampling frame to surround the feature object and moves the sampling frame as the feature object moves; and the microprocessor sets a reference point in the sampling frame; and when the microprocessor recognizes a plurality of feature objects in the image capturing data, the microprocessor sets a plurality of sampling frames for the plurality of feature objects respectively, and performs the object tracking mode by using a sampling frame having a largest area.

Wherein the microprocessor calculates a horizontal distance and a vertical distance between the reference point and a target coordinate; when the horizontal distance is larger than a horizontal threshold, the microprocessor issues the panning command to drive the turning module to change the image capturing direction, to move the reference point towards the target coordinate horizontally by at least one horizontal unit; and when the vertical distance is larger than a vertical threshold, the microprocessor issues the panning command to control the turning module, to move the reference point in the image capturing data towards the target coordinate vertically by at least one vertical unit.

Wherein the microprocessor continuously determines whether the feature object keeps within the image capturing data; when the feature object does not keep within the image capturing data, and the feature object is sheltered by another feature object, the microprocessor chooses the corresponding sampling frame of the another feature object to perform the object tracking mode, and sets the reference point anew; when the feature object does not keep within the image capturing data, and the feature object is not sheltered by another feature object, the microprocessor chooses another sampling frame having a largest area in the image capturing data to perform the object tracking mode, and sets the reference point anew.

This disclosure further proposes an automatic object tracking method, applicable to a handheld mobile device and a tracking dock between which a communication link is established; wherein the handheld mobile device captures image capturing data in an image capturing direction by using an image capturing unit, generates a panning command, and issues the panning command to the tracking dock, the tracking dock is configured to support the handheld mobile device, and receives a turning control signal to change the image capturing direction; the method includes the following steps: triggering the handheld mobile device to perform an object tracking mode, and performing the object tracking mode on a feature object in the image capturing data; defining a horizontal coordinate axis and a vertical coordinate axis that are perpendicular to each other in the image capturing data, wherein defining a length of the image capturing data along the horizontal coordinate axis into a plurality of horizontal units, and defining a height of the image capturing data with respect to the horizontal coordinate axis into a plurality of vertical units; when the feature object is recognized from the image capturing data, setting a sampling frame to surround the feature object, and setting a reference point in the sampling frame; and when a plurality of feature objects are recognized, setting a plurality sampling frames for the plurality of feature objects respectively, and performing the object tracking mode by using the sampling frame having a largest area in the image capturing data; calculating a horizontal distance and a vertical distance between the reference point and a target coordinate; wherein when the horizontal distance is larger than a horizontal threshold, issuing the panning command to change the image capturing direction to move the reference point towards the target coordinate horizontally by at least one horizontal unit; and when the vertical distance is larger than a vertical threshold, issuing the panning command to change the image capturing direction, to move the reference point in the image capturing data towards the target coordinate vertically by at least one vertical unit and continuously determining whether the feature object keeps within the image capturing data; when the feature object does not keep within the image capturing data, and the feature object is sheltered by another feature object, choosing the corresponding sampling frame of the another feature object to perform the object tracking mode, and sets the reference point anew; when the feature object does not keep within the image capturing data, and the feature object is not sheltered by another feature object, choosing another sampling frame having a largest area in the image capturing data to perform the object tracking mode, and setting the reference point anew.

In at least one embodiment of this disclosure, an image capturing direction is adjusted only when a displacement of a reference point exceeds a threshold in the technical measure provided in this disclosure, a panning motion of an image capturing unit does not follow a human face excessively, so that image capturing data is prevented from becoming excessively shaky, and the image capturing direction is gradually adjusted only when a movement distance is relatively large, so that the image capturing data can be relatively stable, and a manner of panning shot is relatively smooth. Moreover, By renewing the target for the object tracking mode, the a panning motion of the image capturing unit does not follow a single target excessively, so that the field-of-view of the image capturing data is prevented from waving excessively.

DETAILED DESCRIPTION

Figure 1:
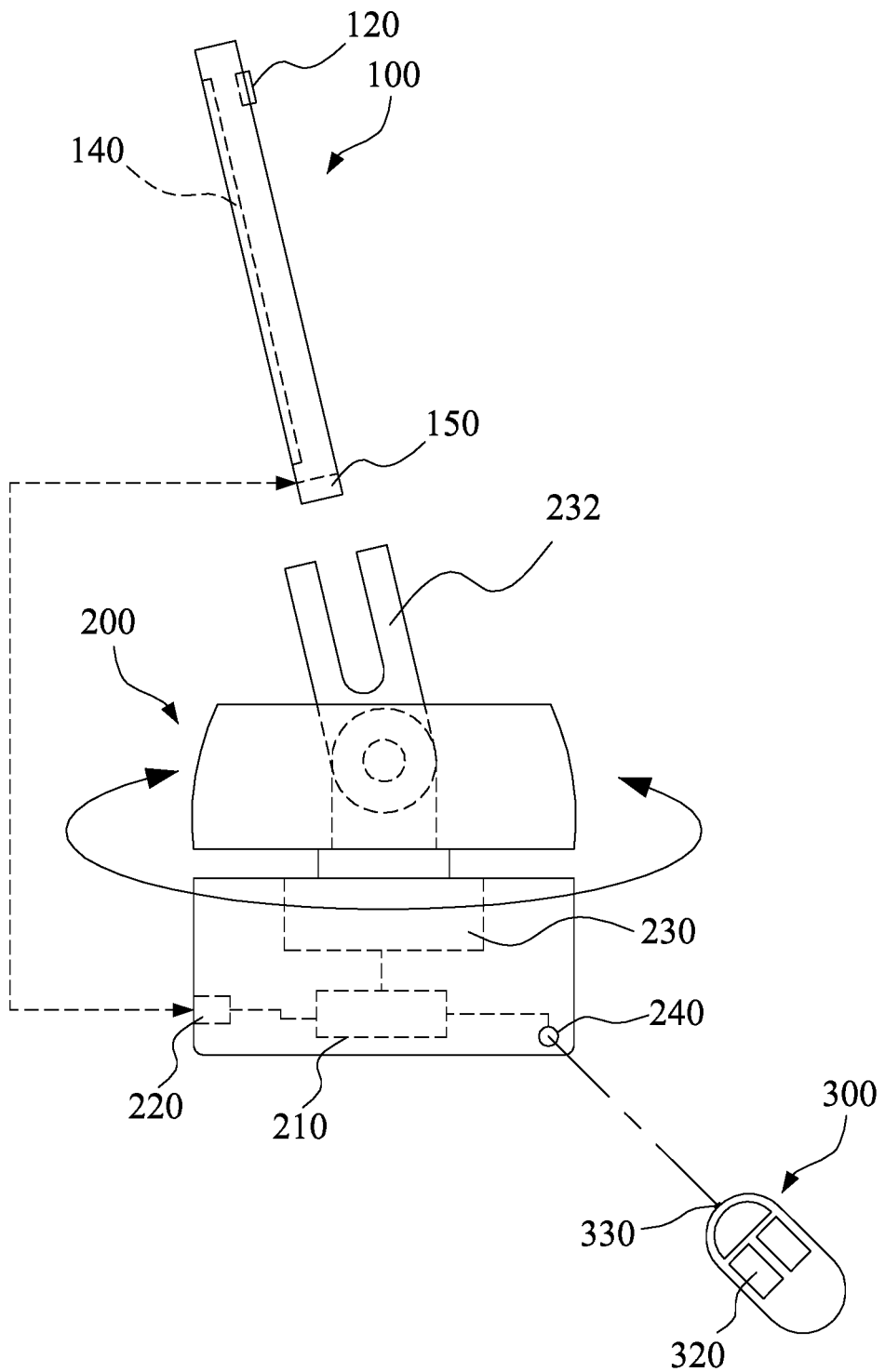
FIG. 1 is a schematic system diagram of an automatic object tracking system according to an embodiment of this disclosure.
Figure 2:
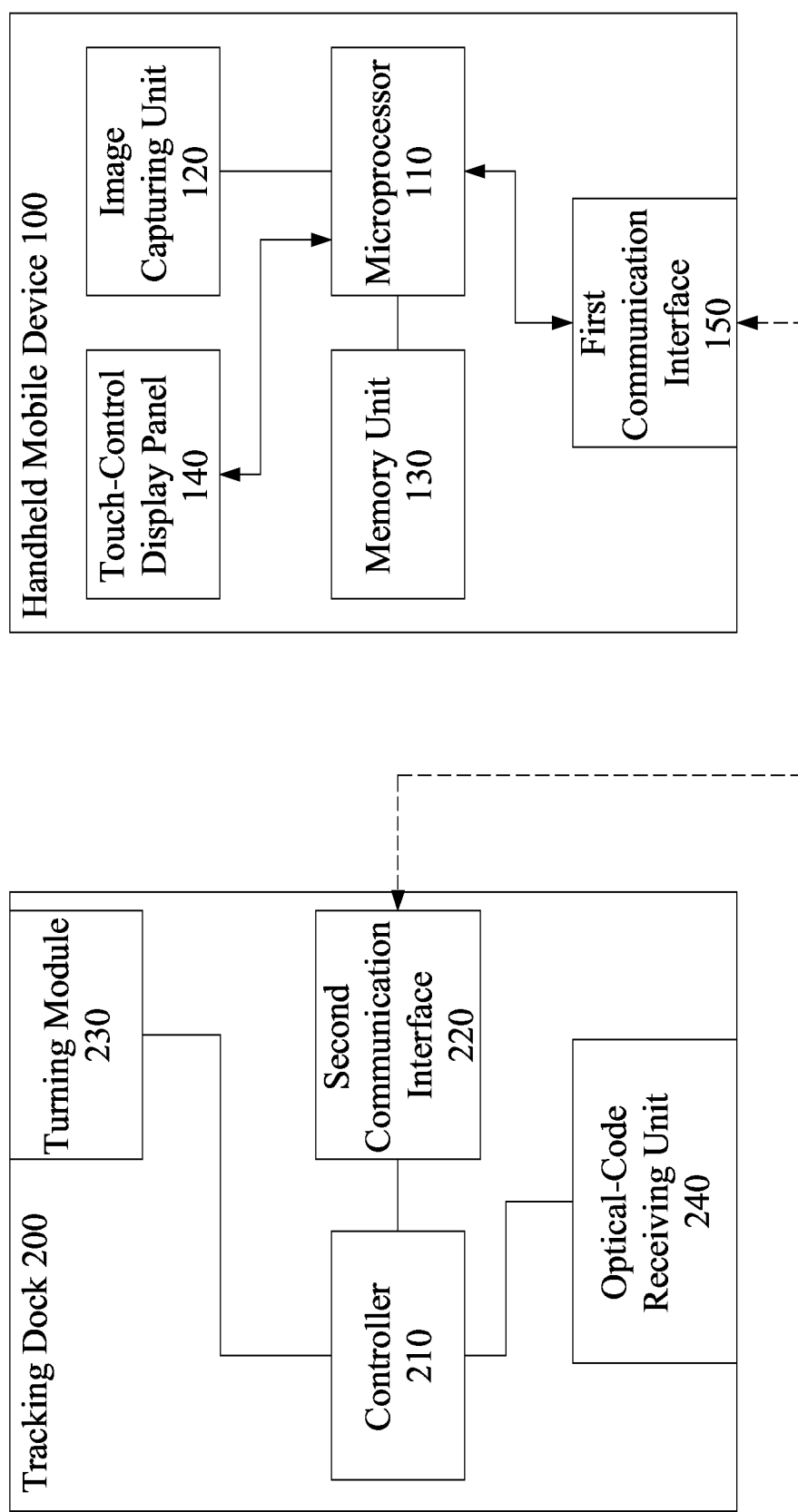
FIG. 2 is a circuit block diagram of a handheld mobile device and a tracking dock according to an embodiment of this disclosure.

As shown in FIG. 1 and FIG. 2, an automatic object tracking system disclosed in an embodiment of this disclosure is configured to perform an automatic object tracking method. The automatic object tracking system includes a handheld mobile device 100, a tracking dock 200, and a remote control device 300. The handheld mobile device 100 is supported on the tracking dock 200, and is configured to captures an image capturing data M in an image capturing direction. The handheld mobile device 100 controls the tracking dock 200 to turn, to change the image capturing direction of the handheld mobile device 100 to track a feature object A.

The handheld mobile device 100 may be an electronic apparatus such as a smartphone or a tablet computer that has an image capturing function and a video recording function and may establish a communication link with the tracking dock 200.

As shown in FIG. 1 and FIG. 2, the handheld mobile device 100 includes a microprocessor 110, an image capturing unit 120, a memory unit 130, a touch-control display panel 140, and a first communication interface 150.

As shown in FIG. 1 and FIG. 2, the image capturing unit 120, the memory unit 130, and the touch-control display panel 140 are electrically connected to the microprocessor 110. The image capturing unit 120 is configured to capture the image capturing data M, transfer the image capturing data M to the microprocessor 110, and transmit the image capturing data M to the memory unit 130 to store the image capturing data M.

As shown in FIG. 2, the memory unit 130 stores, in addition to the image capturing data M, an operating system and a panning shot application program for the microprocessor 110 to load and perform an object tracking mode.

As shown in FIG. 1 and FIG. 2, the touch-control display panel 140 is electrically connected to the microprocessor 110, and is configured to display the image capturing data M, receive a touch control operation, and feedback the touch control operation to the microprocessor 110.

As shown in FIG. 1 and FIG. 2, the first communication interface 150 is electrically connected to the microprocessor 110, and is configured to establish a communication link. The first communication interface 150 may be a wired communication interface, for example, a USB interface, or may be a wireless communication interface, for example, Bluetooth, an RF communication interface, and a Wi-Fi interface (supporting Wi-Fi Direct).

As shown in FIG. 1 and FIG. 2, the tracking dock 200 includes a controller 210, a second communication interface 220, a turning module 230, and an optical-code receiving unit 240.

As shown in FIG. 1 and FIG. 2, the second communication interface 220 is electrically connected to the controller 210, and is configured to establish a communication link with the first communication interface 150, so that the controller 210 of the tracking dock 200 establishes a communication link with the handheld mobile device 100.

As shown in FIG. 1 and FIG. 2, the turning module 230 is electrically connected to the controller 210, and the turning module 230 is configured to support the handheld mobile device 100, The controller 210 drives the turning module 230 according to a panning command to turn, to enable the turning module 230 to rotate or incline the handheld mobile device 100 horizontally and vertically to change the image capturing direction.

The turning module 230 usually includes one or more motors, a necessary gear box, and a fixture 232. The fixture 232 is configured to hold the handheld mobile apparatus 100, so as to support the handheld mobile device 100 on the turning module 230. A combination of the motor and the gear box is configured to rotate the fixture 232 in one or more axial directions. A combination of the motor, the gear box, and the fixture 232 is common knowledge in the technical field of this disclosure, and details of the technical measure of the combination are not described in detail.

As shown in FIG. 1 and FIG. 2, the optical-code receiving unit 240 is electrically connected to the controller 210, and is configured to receive an optical-code signal that carries a tracking-start code, and transfer the optical-code signal to the controller 210, to enable the controller 210 to trigger the microprocessor 110 when the tracking-start code is received to start to perform the object tracking mode.

Figure 3:
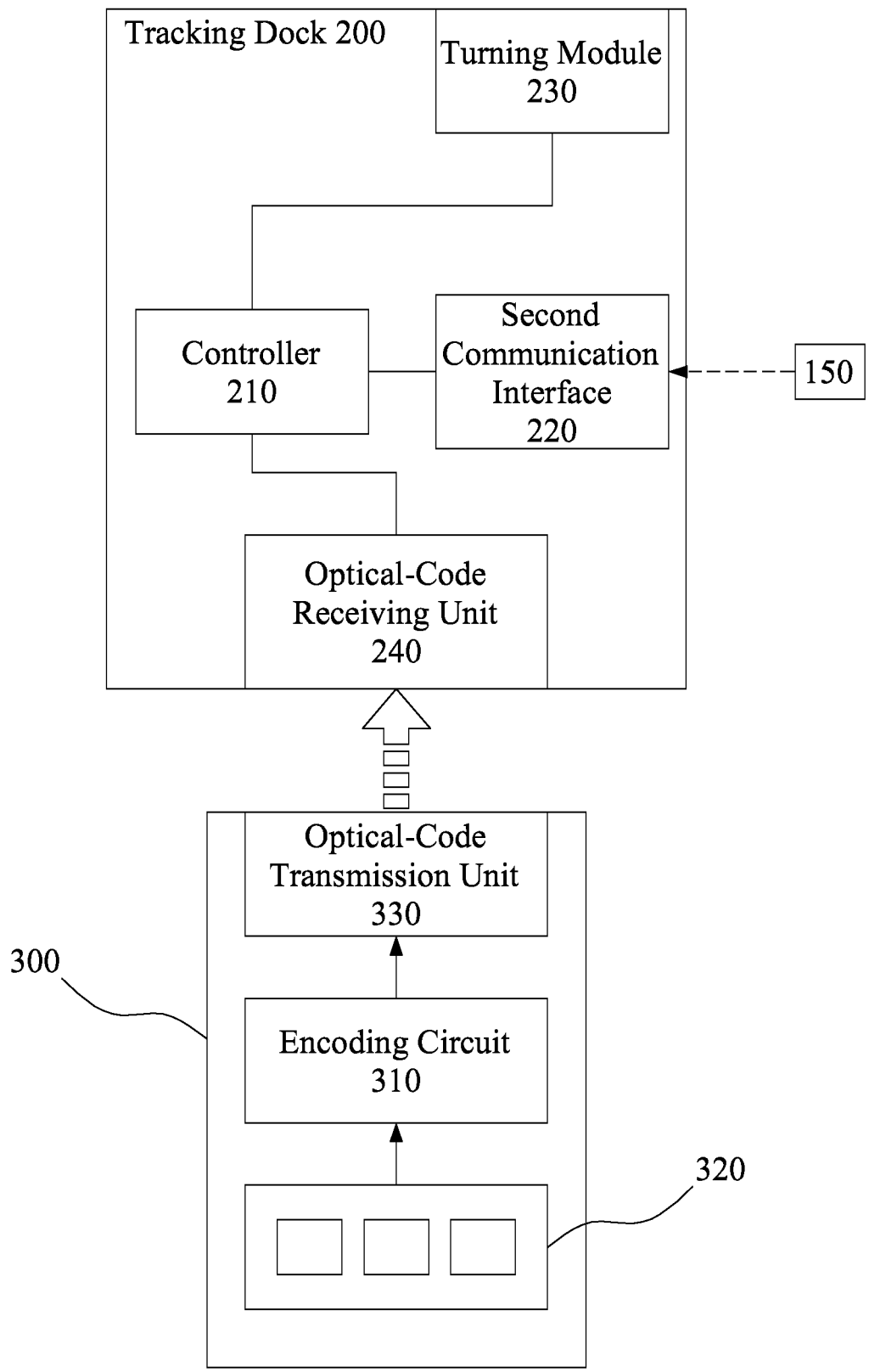
FIG. 3 is a circuit block diagram of a tracking dock and a remote control device according to an embodiment of this disclosure.

As shown in FIG. 1 and FIG. 3, the remote control device 300 includes an encoding circuit 310, a key group 320, and an optical-code transmission unit 330.

The encoding circuit 310 stores at least one tracking-start code. The tracking-start code corresponds to a dedicated tracking dock 200. The optical-code transmission unit 330 is electrically connected to the encoding circuit 310. When the key group 320 is pressed to form a specific key combination (keys are pressed at the same time, or a single key is rapidly pressed a specific number of times), the key group 320 triggers the encoding circuit 310 to drive the optical-code transmission unit 330 to emit the optical-code signal that carries the tracking-start code, so that the optical-code receiving unit 240 of the tracking dock 200 receives the optical-code signal that carries the tracking-start code.

As shown in FIG. 2 and FIG. 3, when the optical-code receiving unit 240 receives the tracking-start code, the controller 210 determines whether the tracking-start code is dedicated. If the tracking-start code is dedicated, the controller 210 triggers the microprocessor 110 to start to perform the object tracking mode. If the tracking-start code is not dedicated, or the optical-code signal does not carry the tracking-start code, the controller 210 does not trigger the microprocessor 110 to perform the object tracking mode, or further triggers the microprocessor 110 to disable the object tracking mode.

Figure 4:
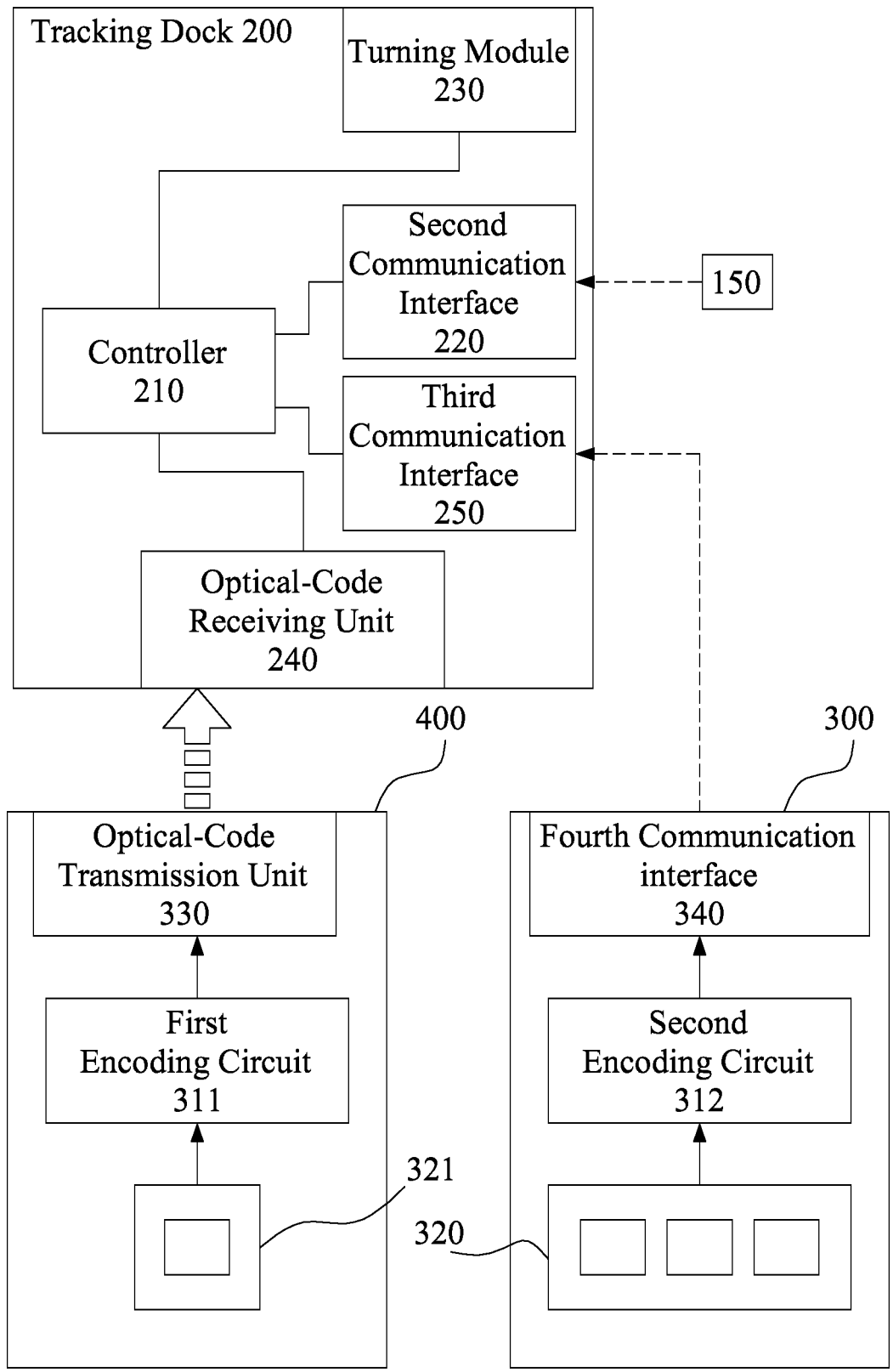
FIG. 4 is a circuit block diagram of an optical tracker, a remote control device and a tracking dock according to a second embodiment of this disclosure.

As shown in FIG. 4, which illustrates a circuit block diagram of an optical tracker, a remote control apparatus and a tracking dock according to another embodiment of this disclosure. In this embodiment, the components for emitting the optical-code signal are separated from the remote control apparatus 300, to form the independent optical tracker 400. Meanwhile, the encoding circuit 310 is divided into a first encoding circuit 311 and a second encoding circuit 312 in this embodiment. The tracking-start code is not carried by the optical-code signal; alternatively, the optical-code signal is carried by a wireless signal.

As shown in FIG. 4, the optical signal source 400 includes an optical-code transmission unit 330, a first encoding circuit 311, and at least one first key 321. The optical-code transmission unit 330 is configured to emit an optical positioning signal. The first encoding circuit 311 is configured to generate a designated identification code and configured to drive the optical-code transmission unit 330 to emit the optical positioning signal S according to the designated identification code, such that the optical positioning signal carries the designated identification code; The at least one first key 321 is electrically connected to the first encoding circuit 311, configured to be pressed to trigger the first encoding circuit 311 to drive the optical-code transmission unit 330 to emit the optical positioning signal. The optical positioning signal is provided to be received by the optical-code receiving unit 240, and the optical positioning signal is analyzed by the controller 210 of the tracking dock 200 to drive the turning module 230 accordingly, to enable the image capturing direction to approach the optical tracker 400 and then the object tracking mode is able to perform sequentially.

As shown in FIG. 4, in this embodiment, the tracking dock 200 and the remote control device 300 are modified. In this embodiment, the tracking dock 200 further includes a third communication interface 250, electrically connected to the controller 210. The remote control device 300 further includes a fourth communication interface 340, electrically connected to the second encoding circuit 312. The third communication interface 250 and the fourth communication interface 340 are configured to establish a communication link with each other. The third communication interface 250 and the fourth communication interface 340 may be wireless communication interfaces, Bluetooth, an RF communication interfaces, and a Wi-Fi interfaces (supporting Wi-Fi Direct). In particular, in this embodiment, the communication link between third communication interface 250 and the fourth communication interface 340, and the communication link between first communication interface 150 and the second communication interface 250 adopt different communication protocols.

As shown in FIG. 4, different keys in the key group 320 are configured to trigger the encoding circuit 310 to issue the tracking-start code or other function command codes. The function command codes can be but not limited to operations of turning on or off a capturing function, or triggering a shutter for capturing a single photo. The tracking-start code and the function command codes are issued through the fourth communication interface 340. The tracking-start code or the function command codes are received by the tracking dock 200 via the third communication interface 250. Then the tracking-start code or the function command code are transferred to the handheld mobile device 100 through the first communication interface 150 and the second communication interface 220, so that related functions of the handheld mobile device 100 are performed by using the remote control device 300.

Figure 5:
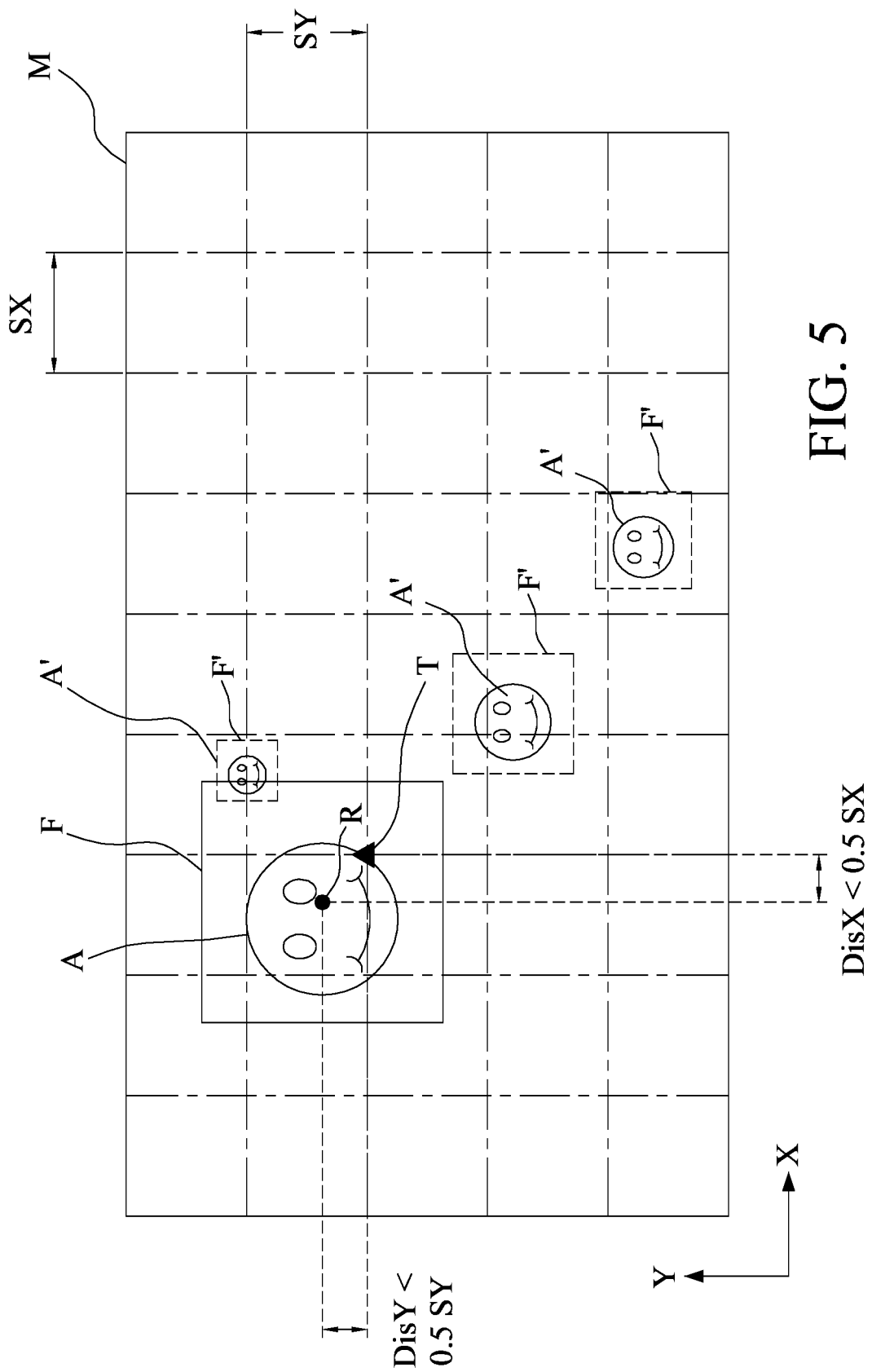
FIG. 5 is a schematic diagram of generating a sampling frame and a reference point according to a feature object according to an embodiment of this disclosure.

As shown in FIG. 5, after performing the object tracking mode, the microprocessor 110 defines a horizontal coordinate axis X and a vertical coordinate axis Y that are perpendicular to each other in the image capturing data M. The microprocessor 110 defines a length of the image capturing data M along the horizontal coordinate axis X into a plurality of horizontal units SX, and defines a height of the image capturing data M with respect to the horizontal coordinate axis X into a plurality of vertical units SY.

After the handheld mobile device 100 performs the object tracking mode, the microprocessor 110 recognizes the feature object A, for example, a human face, from the image capturing data M if the feature object A is not recognized from the image capturing data M, the microprocessor 110 issues the panning command to control the tracking dock 200 to continuously change the image capturing direction until the feature object A is recognized from the image capturing data M.

As shown in FIG. 5, after the feature object A is recognized, the microprocessor 110 sets a sampling frame F to surround the feature object A and moves the sampling frame F as the feature object A moves, so that the feature object A stays in the sampling frame F. The microprocessor 110 may adjust an image scale of the image capturing unit 120 in real time, to keep a proportion of the sampling frame F in the image capturing data M unchanged. The microprocessor 110 sets a reference point R in the sampling frame F.

As shown in FIG. 5, if the microprocessor 110 recognizes a plurality of feature objects A, A' at the same time, the microprocessor 110 sets a plurality of sampling frames F and F' for the plurality of feature objects A, A' respectively, and performs the object tracking mode by using a sampling frame F having the largest area. Alternatively, a user may use the touch-control display panel 140 to choose a feature object A on which the object tracking mode needs to be performed.

As shown in FIG. 5, the microprocessor 110 calculates a horizontal distance Dis X and a vertical distance Dis Y between the reference point R and a target coordinate T. The foregoing target coordinate T may be preset and stored in the memory unit 130 and loaded by the microprocessor 110. For example, the preset target coordinate T may be located at a central position of the image capturing data M. The target coordinate T may be directly chosen by the user with a tap on the touch-control display panel 140. Furthermore, the user may manually operate on the touch-control display panel 140 to draw the sampling frame F to change the feature object A to be tracked to, for example, another human face.

The microprocessor 110 loads a horizontal threshold and a vertical threshold from the memory unit 130. The horizontal threshold is usually less than one horizontal unit SX, and the vertical threshold is usually less than one vertical unit SY.

Figure 6:
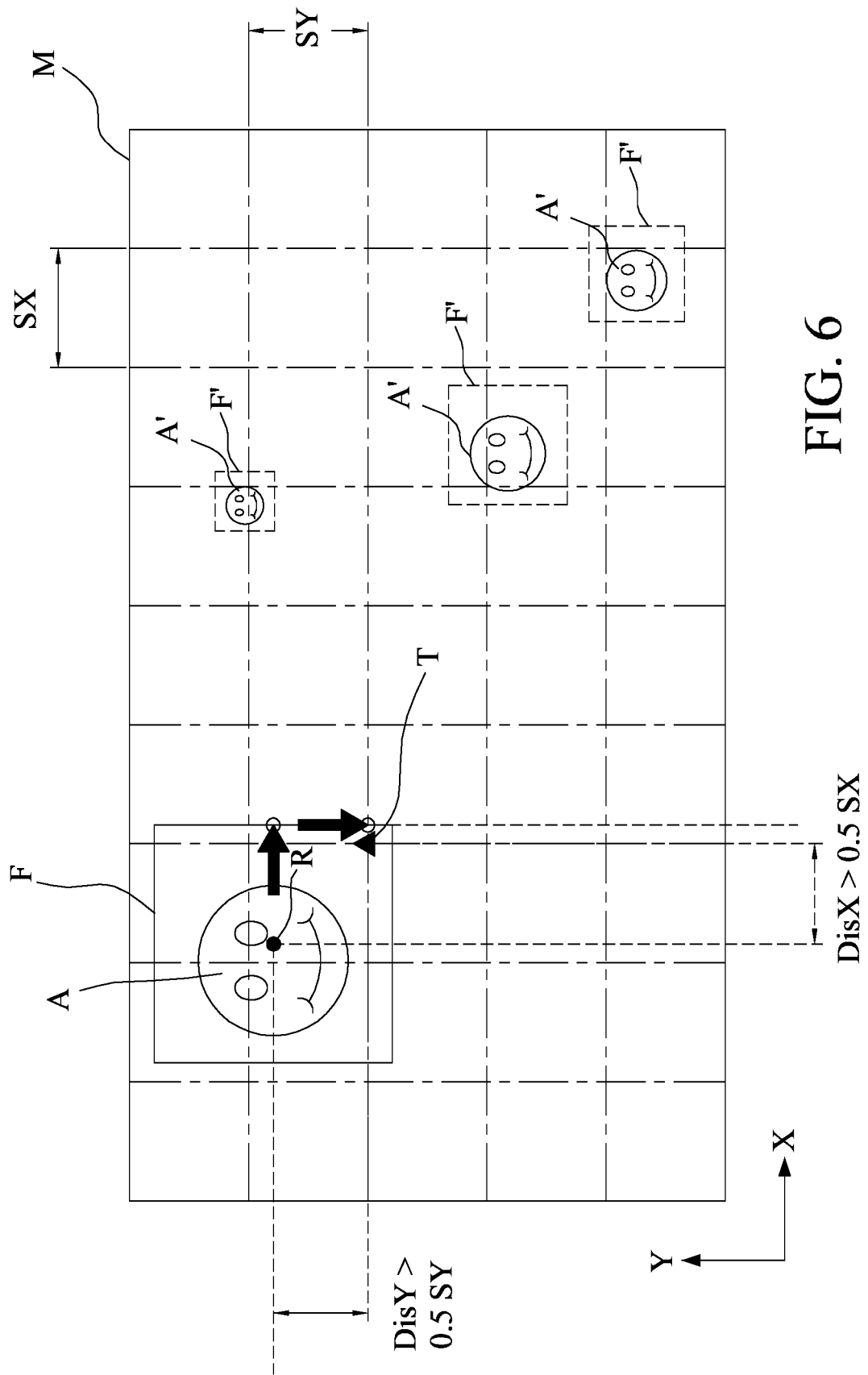
FIG. 6 is a schematic diagram of changing an image capturing direction according to a reference point and a target coordinate according to an embodiment of this disclosure.

As shown in FIG. 6, When the horizontal distance Dis X is larger than a horizontal threshold, the microprocessor 110 issues the panning command to control the turning module 230 by using the controller 210 to change the image capturing direction, to enable the image capturing direction to rotate in a horizontal direction, so that the reference point R moves towards the target coordinate T horizontally by at least one horizontal unit SX. In fact, a rotational direction of the turning module 230 in the horizontal direction is opposite to a horizontal movement direction of the reference point R in the image capturing data M. Meanwhile, When the vertical distance Dis Y is larger than a vertical threshold, the microprocessor 110 controls the turning module 230 to change the image capturing direction, to enable the image capturing direction to change a vertical tilt, so that the reference point R moves towards the target coordinate T vertically by at least one vertical unit SY. In fact, a direction in which the turning module 230 changes a tilt is opposite to a vertical movement direction of the reference point R in the image capturing data M.

As shown in FIG. 5, in one specific embodiment, the horizontal threshold is 0.5 horizontal units SX, and the vertical threshold is 0.5 vertical units SY. When the horizontal distance Dis X is less than 0.5 horizontal units SX, the microprocessor 110 does not control the turning module 230 to operate; and when the vertical distance Dis Y is less than 0.5 vertical units SY, the microprocessor 110 does not control the turning module 230 to operate.

As shown in FIG. 6, when the horizontal distance Dis X is larger than 0.5 horizontal unit SX, the microprocessor 110 controls the turning module 230 by using the controller 210 to enable the reference point R to move towards the target coordinate T horizontally by one horizontal unit SX. The microprocessor 110 may further load an advanced horizontal threshold. For example, when the horizontal distance Dis X is larger than 1.5 horizontal units SX, the microprocessor 110 controls the turning module 230, to enable the reference point R to move towards the target coordinate T horizontally by two horizontal units SX.

As shown in FIG. 6, similarly, when the vertical distance Dis Y is larger than 0.5 vertical unit SY, the microprocessor 110 controls the turning module 230 by using the controller 210 to enable the reference point R to move towards the target coordinate T vertically by one vertical unit SY. The microprocessor 110 may further load an advanced vertical threshold. For example, when the vertical distance Dis Y is larger than 1.5 vertical units SY, the microprocessor 110 controls the turning module 230, to enable the reference point R to move towards the target coordinate T in the image capturing data M horizontally by two vertical units SY. The reference point R may move along the horizontal coordinate axis X and the vertical coordinate axis Y synchronously or sequentially.

Figure 7:
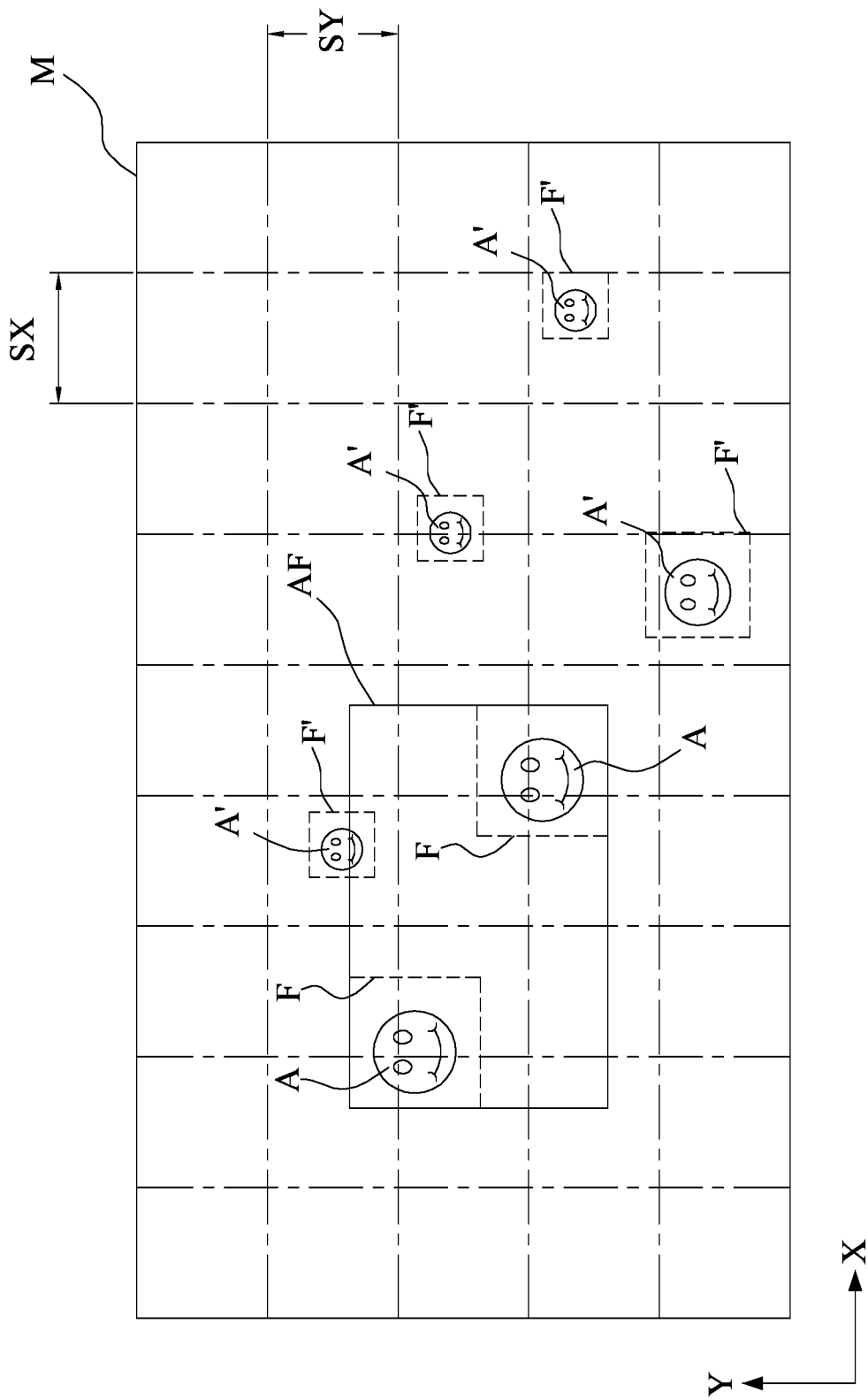
FIG. 7 is a schematic diagram of choosing some of a plurality of sampling frames and performing an object tracking mode according to an embodiment of this disclosure.

As shown in FIG. 7, in another object tracking method of this disclosure, when a plurality of feature objects A, A' is recognized, the microprocessor 110 sets a plurality of sampling frames F and F' for the plurality of feature objects A, A' respectively. Then the microprocessor 110 chooses, according to a required tracking quantity in descending order of area, sampling frames F meeting the tracking quantity as tracking objects. The microprocessor 110 sets an auxiliary frame AF to surround the chosen sampling frames F, and sets, by using the auxiliary frame AF as a range, the reference point R between the sampling frames F, to perform the object tracking mode. And then the microprocessor 110 performs the object tracking mode by using the auxiliary frame AF. The tracking quantity may be two or more or all.

Figure 8:
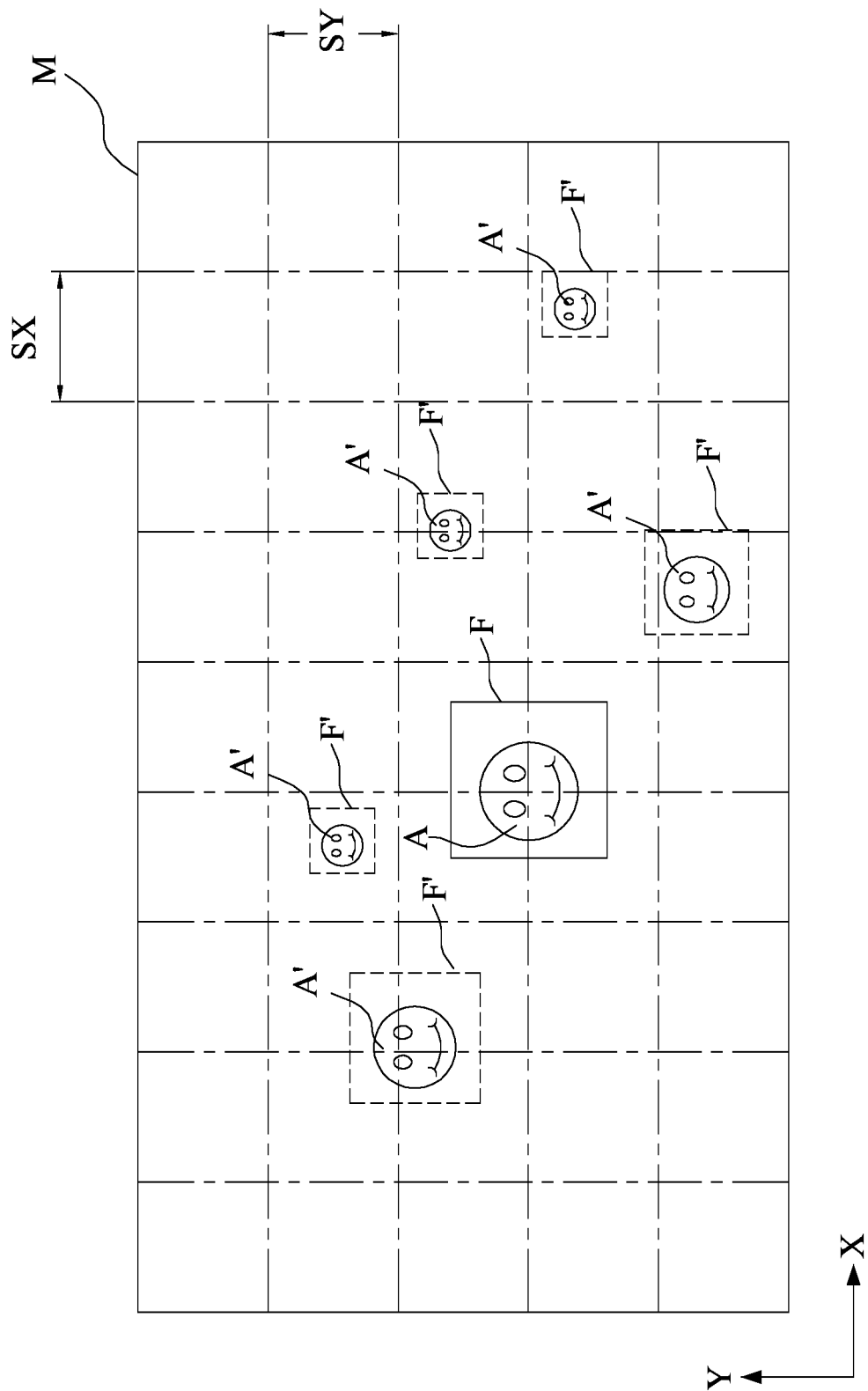
FIG. 8 and FIG. 9 are schematic diagrams of continuously performing an object tracking mode by using a sampling frame having the largest area according to an embodiment of this disclosure.
Figure 9:
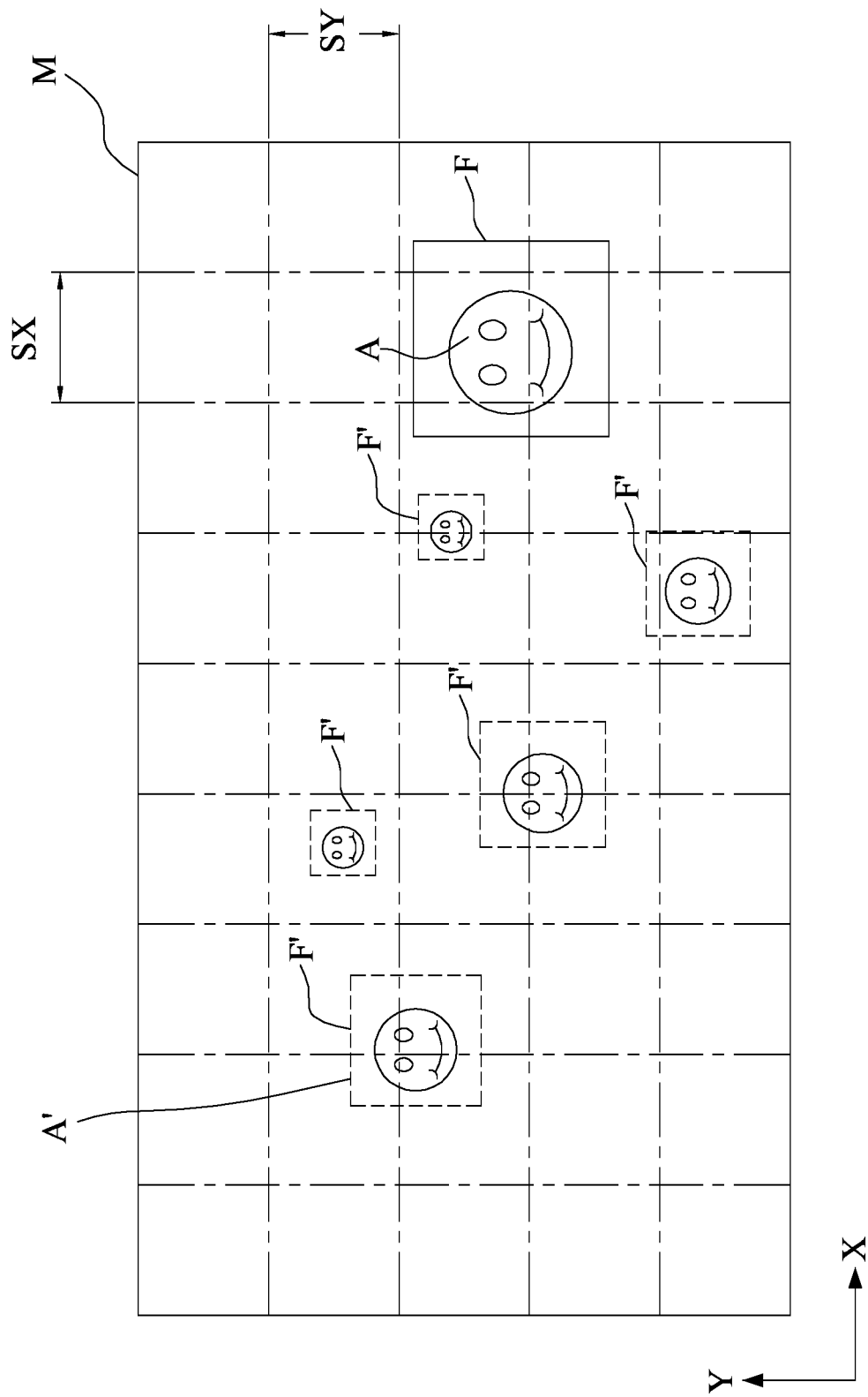

As shown in FIGS. 8 and 9, in another object tracking method of this disclosure, when a plurality of feature objects A, A' is recognized, the microprocessor 110 sets sampling frames F for the plurality of feature objects A, A' respectively, and a sampling frame F having the largest area is used as a tracking object. The microprocessor 110 continuously compares changing sizes of the sampling frames F and changes the tracking object in real time to a sampling frame F having the largest area currently. When many people are photographed in the image capturing data M, the image capturing unit 120 may change at any time the tracking object to a human face that is closest to the image capturing unit 120 (the sampling frame F having the largest area).

Figure 10:
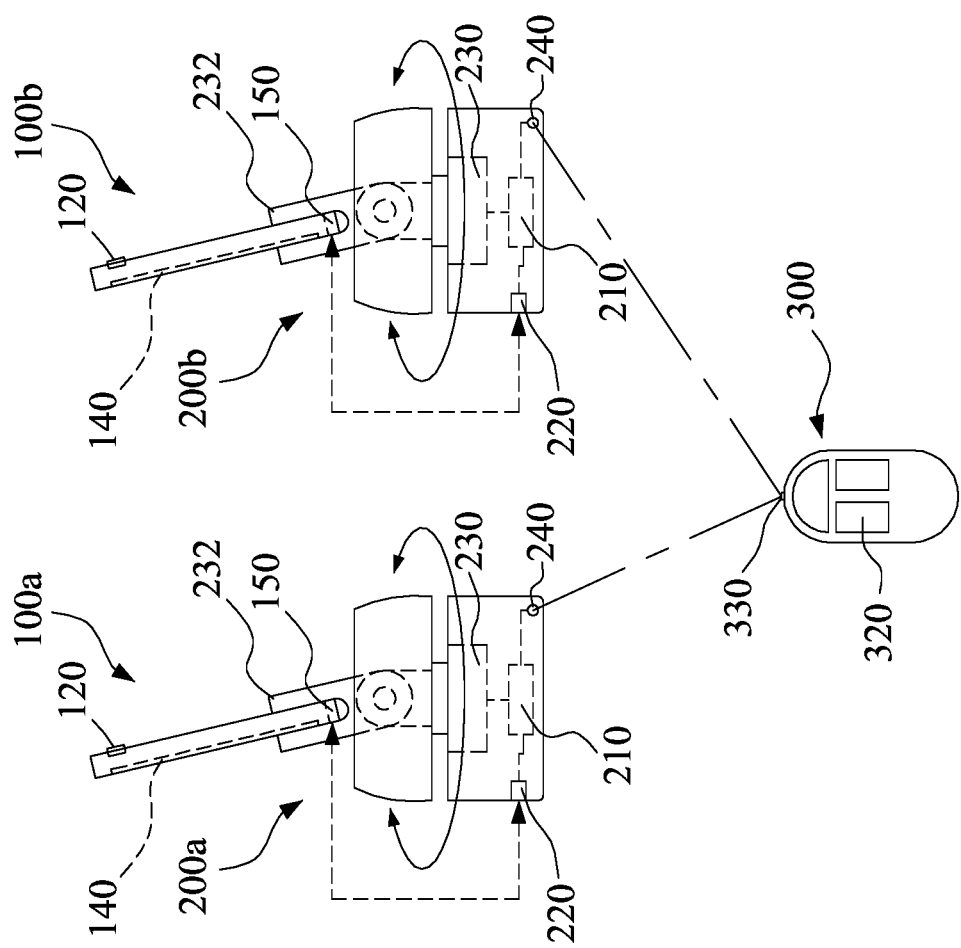
FIG. 10 is a schematic diagram of choosing one of a plurality of groups of handheld mobile devices and tracking docks by using a remote control device to enable an object tracking mode according to an embodiment of this disclosure.

FIG. 10 shows an automatic object tracking system proposed in another embodiment of this disclosure. This automatic object tracking system includes several groups of a handheld mobile device 100a and a handheld mobile device 100b and a tracking dock 200a and a tracking dock 200b that have established communication links in pair respectively, and each of the tracking dock 200a and the tracking dock 200b stores a corresponding tracking-start code. Here, according to the corresponding different tracking dock 200a and tracking dock 200b, a first tracking-start code and a second tracking-start code are distinguished. The first tracking dock 200a corresponds to the first tracking-start code, and the second tracking dock 200b corresponds to the second tracking-start code.

A key group 320 may trigger the first encoding circuit 311 or the second encoding circuit to issue the first tracking-start code, the second tracking-start code, and a stop code separately according to different key combinations. For example, in the case that the first tracking-start code is issued when the key group 320 is pressed once, the second tracking-start code is issued when the key group 320 is pressed rapidly twice, and the stop code is issued when the key group 320 is pressed and held for a period of time or another key group 320 is pressed. The foregoing key combinations are only examples, and different pressing modes or combinations of a plurality of keys may be used.

When a remote control device 300 issues an optical-code signal or a wireless signal that carries the first tracking-start code and the optical-code signal or the wireless signal is received by the first tracking dock 200a, a controller 210 of the first tracking dock 200a may recognize that the optical-code signal or the wireless signal carries the first tracking-start code and trigger the first handheld mobile device 100a supported on the first tracking dock 200a. When receiving the optical-code signal or the wireless signal that carries the first tracking-start code, the second tracking dock 200b recognizes no second tracking-start code and therefore does not operate. Alternatively, when receiving the first tracking-start code, the second tracking dock 200b may recognize the first tracking-start code as the stop code and trigger a stop of panning shot.

In comparison, When a remote control device 300 issues an optical-code signal or a wireless signal that carries the second tracking-start code and the optical-code signal or the wireless signal is received by the second panning dock 200b, a controller 210 of the second tracking dock 200b may recognize that the optical-code signal or the wireless signal carries the second tracking-start code and trigger the second handheld mobile device 100b supported on the second tracking dock 200b. When the first tracking dock 200a receives the optical-code signal or the wireless signal that carries the second tracking-start code, the first tracking dock 200a recognizes no first tracking-start code and therefore does not operate. Alternatively, when receiving the second tracking-start code, the first tracking dock 200a may recognize the second tracking-start code as the stop code and trigger a stop of panning shot.

When the remote control device 300 issues the optical-code signal or the wireless signal that carries the stop code and the remote control signal is received by the first tracking dock 200a and the second tracking dock 200b, the first tracking dock 200a and the second tracking dock 200b may trigger the first handheld mobile device 100a and the second handheld mobile device 100b respectively to stop panning shot.

Figure 11:
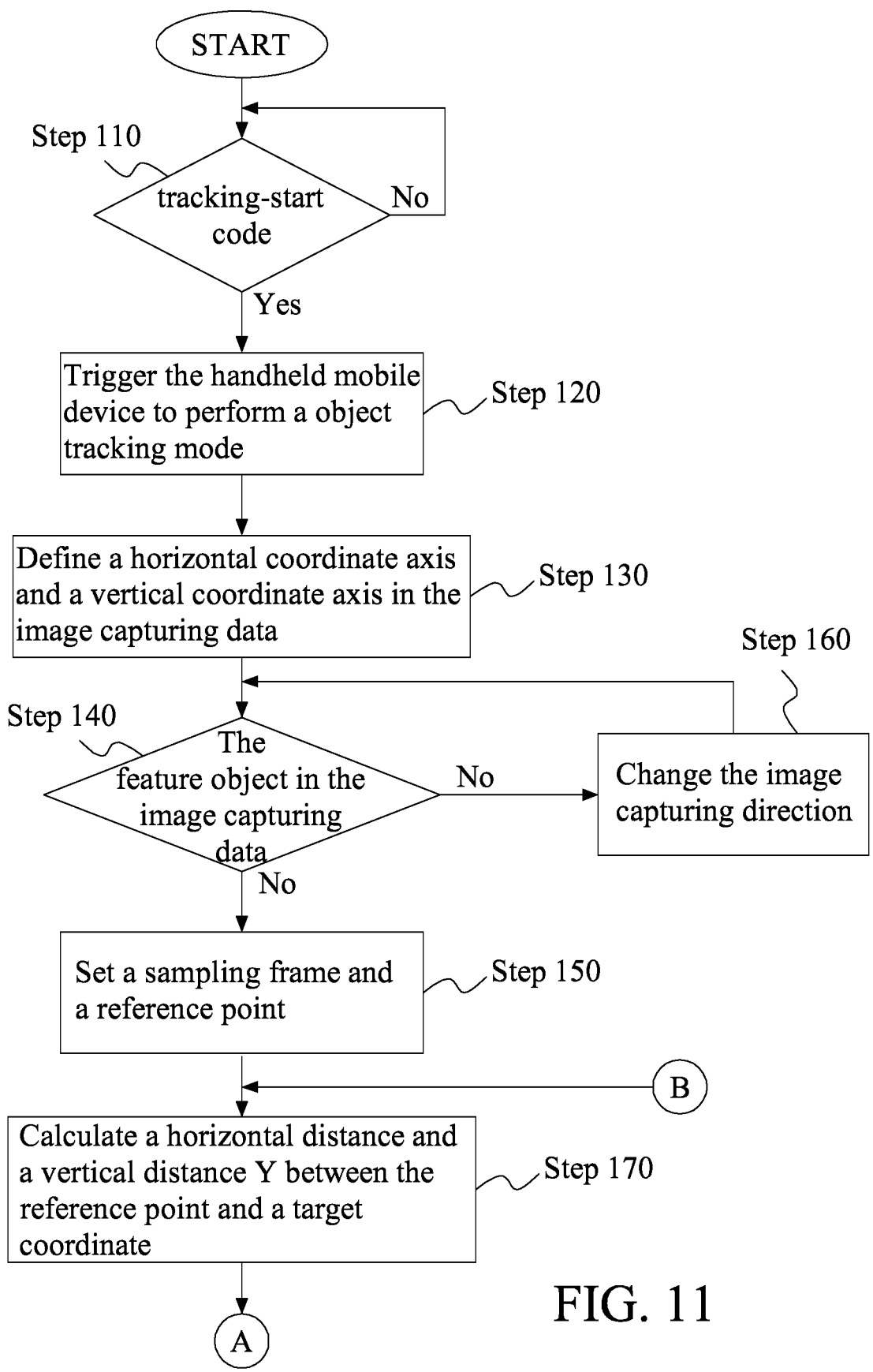
FIG. 11 and FIG. 12 are a flowchart of an automatic object tracking method according to this disclosure.
Figure 12:
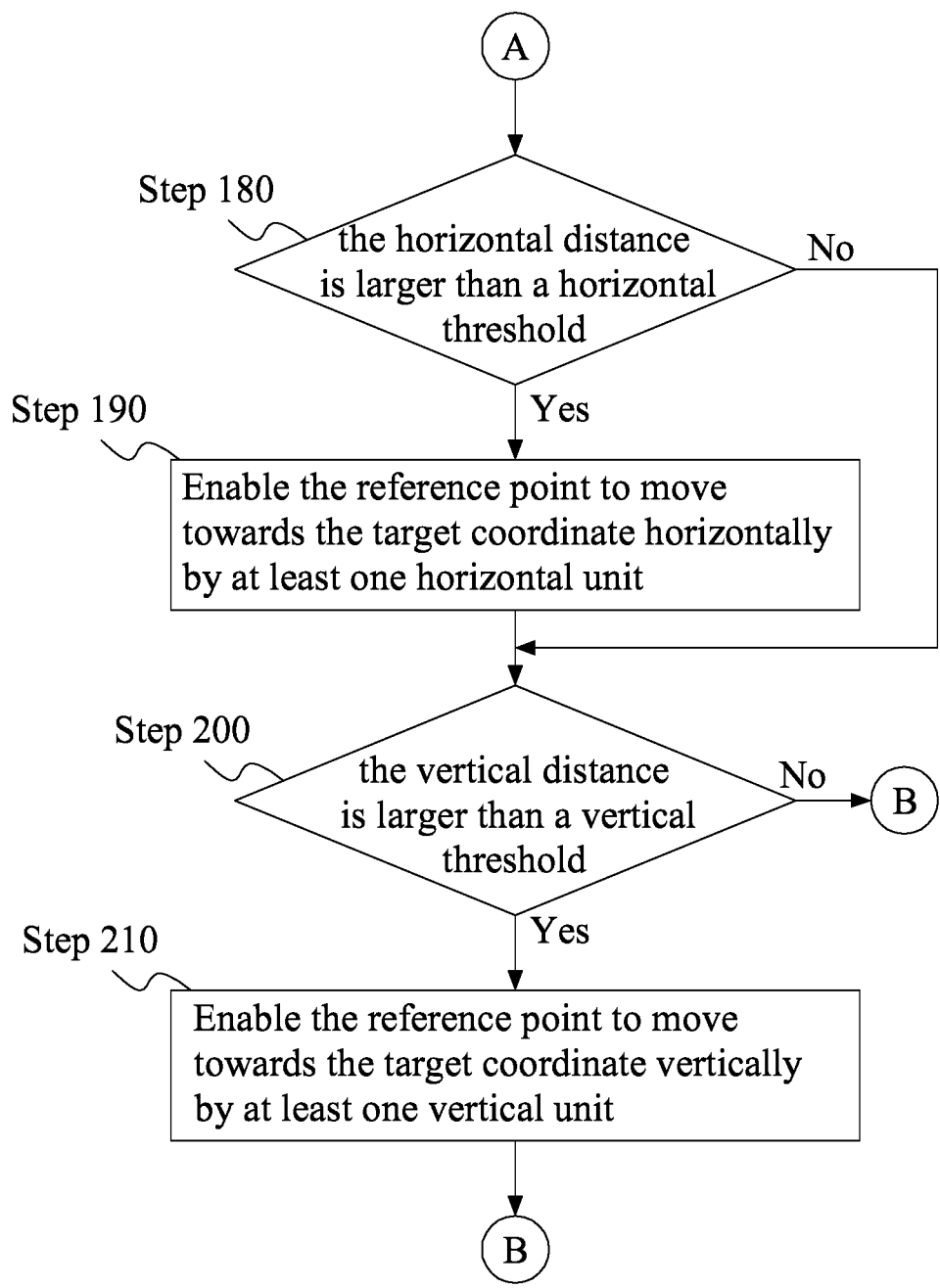

Please refer to FIGS. 11 and 12; this disclosure further proposes an automatic object tracking method, applicable to a handheld mobile device 100 and a tracking dock 200 between which a communication link is established. The handheld mobile device 100 captures an image capturing data M in an image capturing direction by using an image capturing unit 120, generates a panning command, and issues the panning command to the tracking dock 200. The tracking dock 200 is configured to support the handheld mobile device 100, and receive the panning command to change the image capturing direction.

First, the tracking dock 200 receives a tracking-start code to trigger the handheld mobile device 100 to perform an object tracking mode on a feature object A in the image capturing data M, as shown in Step 110 and Step 120.

In the Step 110, the tracking dock 200 continuously waits for an optical-code signal or a wireless signal issued by a remote control device 300, and performs comparison to determine whether the optical-code signal or the wireless includes the tracking-start code. If the optical-code signal or the wireless signal includes the tracking-start code, Step 120 is performed. If the optical-code signal or the wireless signal includes the tracking-start code, the tracking dock 200 waits to receive a next optical-code signal or a next wireless signal. The transmission and reception of an optical-code signal or a wireless signal are disclosed in the foregoing descriptions of the implementation of the automatic object tracking system, and are not described below in detail again.

The handheld mobile device 100 defines a horizontal coordinate axis X and a vertical coordinate axis Y that are perpendicular to each other in the image capturing data M, the handheld mobile device 100 defines a length of the image capturing data M along the horizontal coordinate axis X into a plurality of horizontal units SX, and defines a height of the image capturing data M with respect to the horizontal coordinate axis X into a plurality of vertical units SY, as shown in Step 130.

The handheld mobile device 100 continuously recognizes whether the image capturing data M includes the feature object A, as shown in Step 140.

When the feature object A is recognized from the image capturing data M, the handheld mobile device 100 sets a sampling frame F to surround the feature object A and sets a reference point R in the sampling frame F, as shown in Step 150.

In Step 140, if the feature object A is not recognized from the image capturing data M, the microprocessor 110 of the handheld mobile device 100 issues the panning command to control the tracking dock 200 to continuously change the image capturing direction as shown in Step 160. Recognition is performed repeatedly and the image capturing direction is changed repeatedly until the feature object A is recognized from the image capturing data M.

After Step 150, the handheld mobile device 100 calculates a horizontal distance Dis X and a vertical distance Dis Y between the reference point R and a target coordinate T, as shown in Step 170.

When the horizontal distance Dis X is larger than a horizontal threshold, the handheld mobile device 100 issues the panning command to change the image capturing direction, to enable the reference point R to move towards the target coordinate T horizontally by at least one horizontal unit SX, as shown in Step 180 and Step 190. If the horizontal distance Dis X is not larger than a horizontal threshold, When the vertical distance Dis Y is larger than a vertical threshold, the handheld mobile device 100 issues the panning command to change the image capturing direction, to enable the reference point R in the image capturing data M to move towards the target coordinate T vertically by at least one vertical unit SY, as shown in Step 200 and Step 210. Then, go back to Step 170. If the vertical distance Dis Y is not larger than the vertical threshold, Step 210 is skipped, and Step 170 is directly performed.

Figure 13:
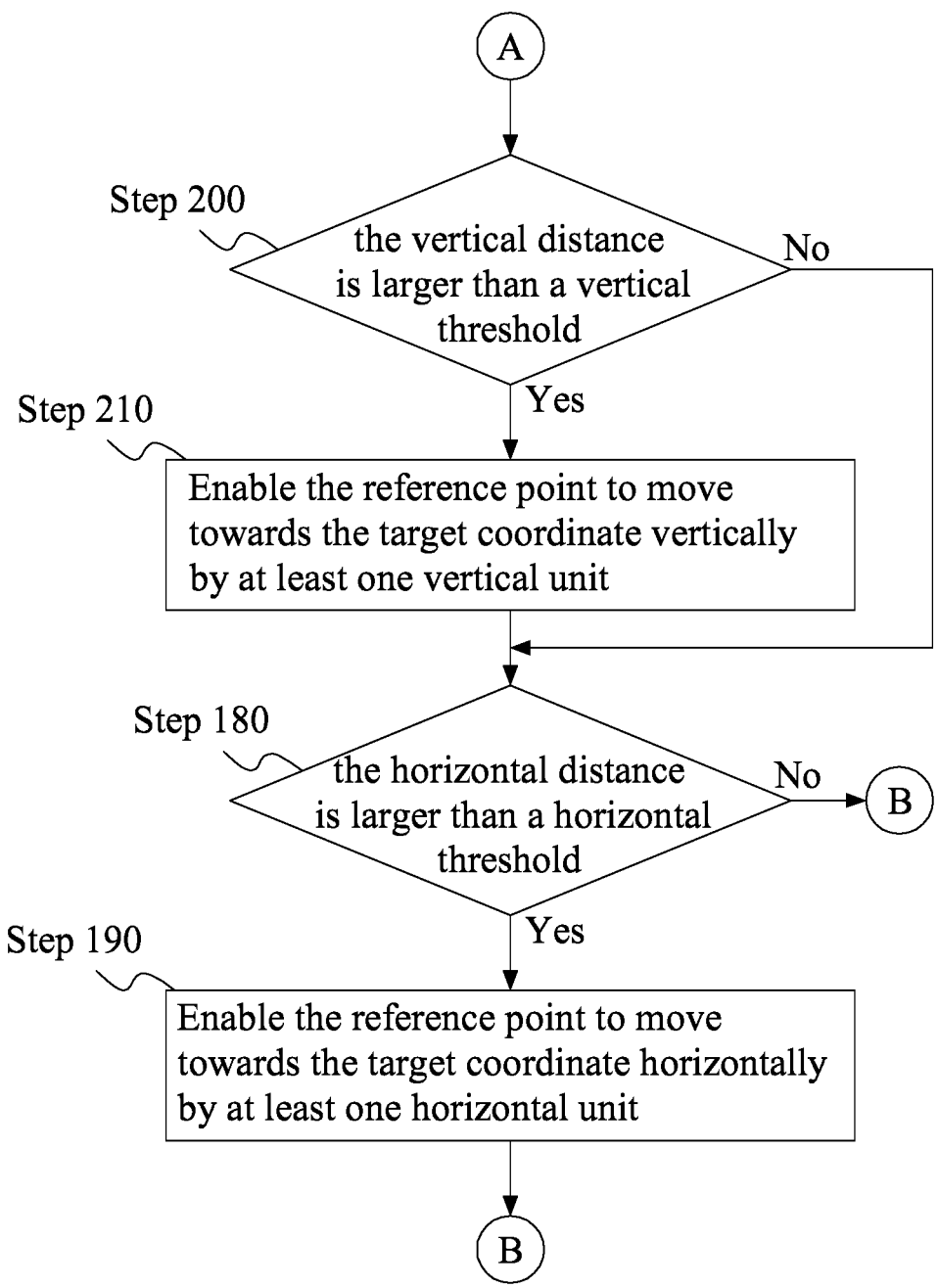
FIG. 13 is another flowchart of an automatic object tracking method according to this disclosure.

As shown in FIG. 13, comparison and adjustment in the horizontal coordinate axis X and comparison and adjustment in the vertical coordinate axis Y may be performed in an opposite order or synchronously, and this disclosure is not limited to the order in FIG. 11.

If a plurality of feature objects A, A' is recognized in Step 140, the handheld mobile device 100 sets sampling frames F and F' for the feature objects A, A' respectively, and performs the object tracking mode by using a sampling frame F having the largest area.

in another approach, If a plurality of feature objects A, A' is recognized in Step 140, the handheld mobile device 100 sets sampling frames F and F' for the feature objects A, A' respectively, chooses, according to a required tracking quantity in descending order of area, sampling frames F meeting the tracking quantity, sets an auxiliary frame AF surrounding the chosen sampling frames F, and sets, by using the auxiliary frame AF as a range, the reference point R between the sampling frames F, to perform the object tracking mode, to perform the object tracking mode.

As shown in FIG. 12, after Step 120, the tracking dock 200 still continuously receives an optical-code signal or a wireless signal, and performs comparison to determine whether the optical-code signal or the wireless includes the tracking-start code. If the optical-code signal or the wireless signal includes the stop code, the tracking dock 200 triggers the handheld mobile device 100 to disable the object tracking mode.

Figure 14:
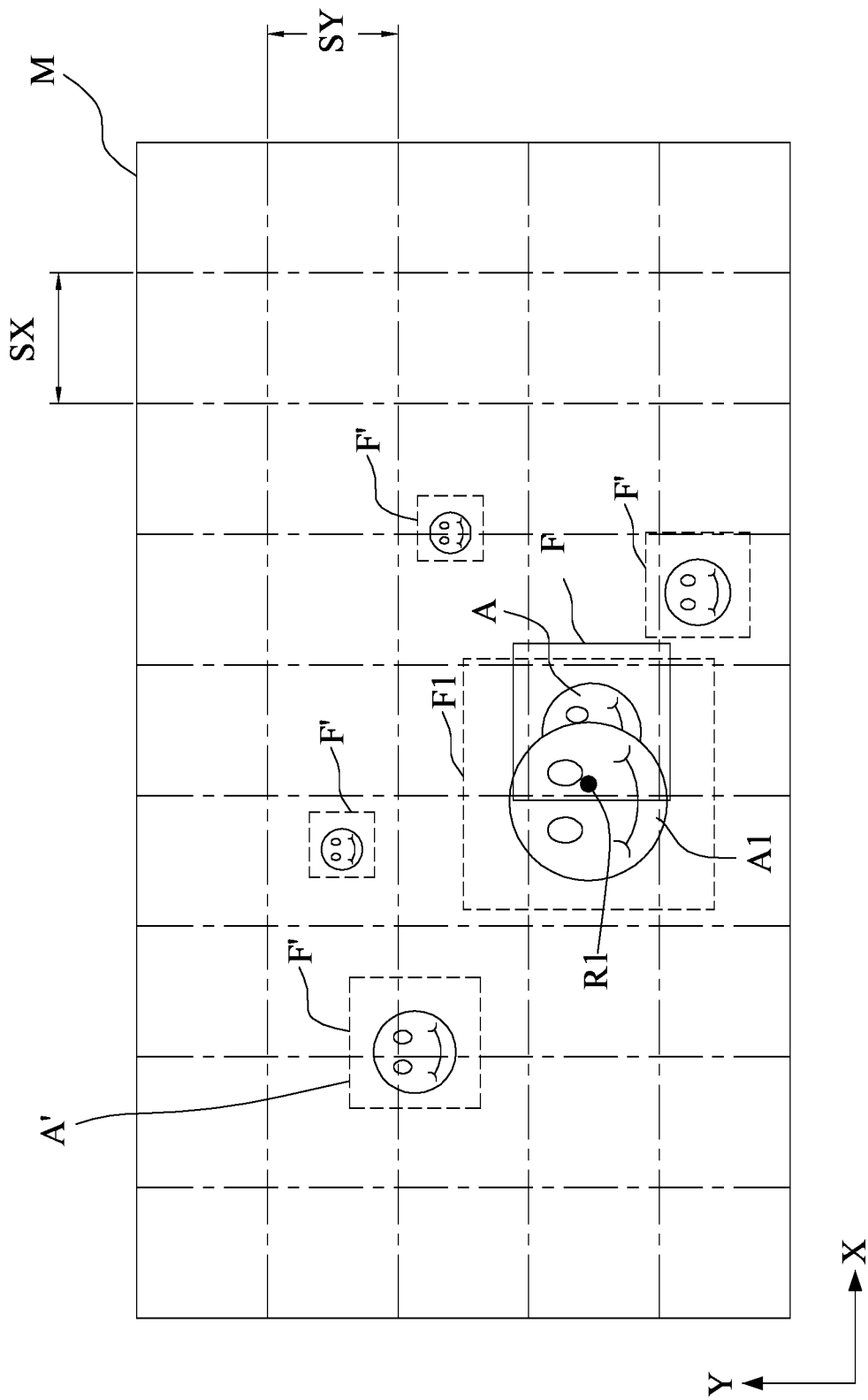
FIG. 14 and FIG. 15 are schematic diagrams illustrating the feature object disappearing in the image capturing data.
Figure 15:
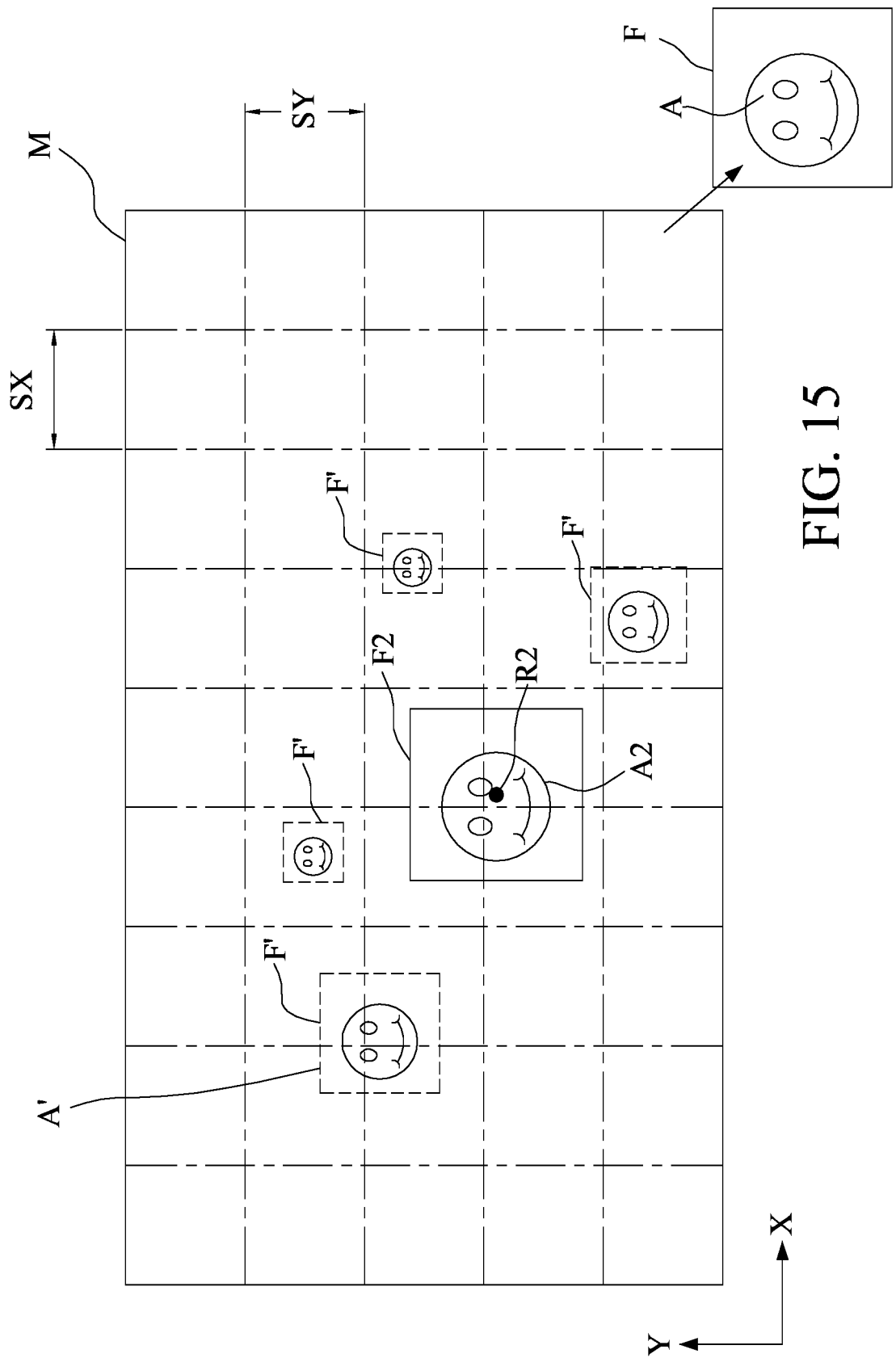

Please refer to FIG. 14 and FIG. 15, when performing the object tracking mode by using a sampling frame F having the largest area, regardless of the changing of the area of the tracked sampling frame F and the corresponding feature object A in the image capturing data, the microprocessor 110 of the handheld mobile device 100 sets this sampling frame F and this feature object A as target to perform the object tracking mode. Under the some situations, this feature object A as the target moves to fast or is sheltered by another feature object A1, the handheld mobile device 100 cannot perform the object tracking mode on this feature object A, and the handheld mobile device 100 has control the tracking dock 200 to continuously change the image capturing direction to search this feature object A. As a result the field-of-view of the image capturing data M changes rapidly.

As shown in FIG. 14 and FIG. 15, after step B, the microprocessor 110 of the handheld mobile device 100 continuously determines whether the feature object A keeps within the image capturing data M, as shown in Step 220.

Figure 16:
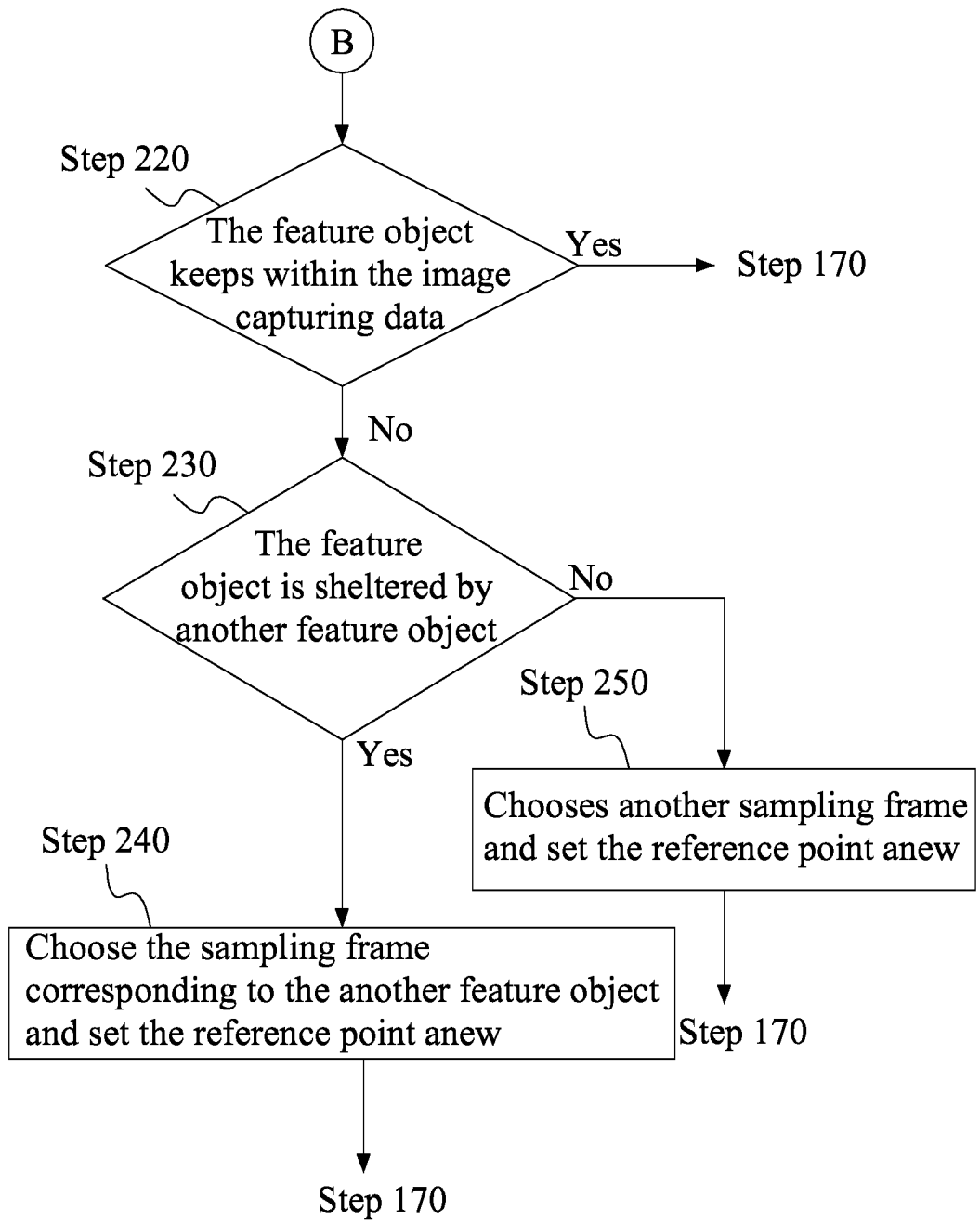
FIG. 16 is another flowchart of an automatic object tracking method according to this disclosure.

As shown in FIG. 14 and FIG. 16, when the feature object A keeps within the image capturing data M, the microprocessor 110 of the handheld mobile device 100 continuously performs Step 170; and when the feature object A does not keep within the image capturing data M, the microprocessor 110 determines whether the feature object A to be tracked is partially of completely sheltered by another feature object A1 during movement, as shown in Step 230.

If the feature object A to be tracked is sheltered by another feature object A1 during movement, the microprocessor 110 chooses the sampling frame F1 corresponding to the another feature object A1 to perform the object tracking mode, and sets the reference point R1 anew, as shown in Step 240. Then the microprocessor 110 of the handheld mobile device 100 continuously performs Step 170. At the moment, another feature object A1 becomes the new target of the object tracking mode.

As shown in FIG. 15 and FIG. 16, if the feature object A is not sheltered by the another feature object A1, it is highly possible the feature object A moves to fast and breaks away from the range of the image capturing data M or the feature object A cannot be recognized from the image capturing data M by the microprocessor 110 because the feature object A turns around (for example, the face of the user turns around). At the moment, the microprocessor 110 chooses another sampling frame F2 having a largest area in the image capturing data M to perform the object tracking mode, and sets the reference point R2 anew, as shown in Step 250. Then the microprocessor 110 of the handheld mobile device 100 continuously performs Step 170. At the moment, another feature object A2 becomes the new target of the object tracking mode. By renewing the target for the object tracking mode, the a panning motion of the image capturing unit 120 does not follow a single target excessively so that the field-of-view of the image capturing data M is prevented from waving excessively.

In the technical measure provided in this disclosure, a panning motion of an image capturing unit does not follow a human face excessively, so that image capturing data is prevented from becoming excessively shaky, and an image capturing direction is gradually adjusted only when a movement distance exceeds a threshold, so that the image capturing data can be relatively stable, so that the image capturing data can be relatively stable, and a manner of panning shot is relatively smooth.

What is claimed is:
1. An automatic object tracking system, comprising:
a handheld mobile device, comprising:
   a microprocessor, configured to perform an object tracking mode;
   an image capturing unit, electrically connected to the microprocessor, and configured to capture image capturing data in an image capturing direction and transfer the image capturing data to the microprocessor; wherein the microprocessor defines a horizontal coordinate axis and a vertical coordinate axis perpendicular to each other in the image capturing data, defines a length of the image capturing data along the horizontal coordinate axis into a plurality of horizontal units, and defines a height of the image capturing data with respect to the horizontal coordinate axis into a plurality of vertical units;
   a memory unit, electrically connected to the microprocessor, and configured to store the image capturing data;
   a touch-control display panel, electrically connected to the microprocessor, and configured to display the image capturing data, receive a touch control operation, and feedback the touch control operation to the microprocessor; and
   a first communication interface, electrically connected to the microprocessor; and
a tracking dock, comprising:
   a controller;
   a second communication interface, electrically connected to the controller, and configured to establish a communication link with the first communication interface to receive a panning command and transfer the panning command to the controller; and a turning module, electrically connected to the controller, and configured to support the handheld mobile device; wherein the controller drives the turning module to turn according to the panning command, to change the image capturing direction of the image capturing unit;

wherein in the object tracking mode, the microprocessor recognizes a feature object from the image capturing data, sets a sampling frame to surround the feature object, and moves the sampling frame as the feature object moves; and the microprocessor sets a reference point in the sampling frame; and when the microprocessor recognizes a plurality of feature objects in the image capturing data, the microprocessor sets a plurality of sampling frames for the plurality of feature objects respectively, and performs the object tracking mode by using the sampling frame having a largest area;

wherein the microprocessor calculates a horizontal distance and a vertical distance between the reference point and a target coordinate; when the horizontal distance is larger than a horizontal threshold, the microprocessor issues the panning command to drive the turning module to change the image capturing direction, to move the reference point towards the target coordinate horizontally by at least one horizontal unit; and when the vertical distance is larger than a vertical threshold, the microprocessor issues the panning command to control the turning module, to move the reference point in the image capturing data towards the target coordinate vertically by at least one vertical unit;

wherein the microprocessor continuously determines whether the feature object keeps within the image capturing data; when the feature object does not keep within the image capturing data, and the feature object is sheltered by another feature object, the microprocessor chooses the corresponding sampling frame of the another feature object to perform the object tracking mode, and sets the reference point anew; when the feature object does not keep within the image capturing data, and the feature object is not sheltered by another feature object, the microprocessor chooses another sampling frame having a largest area in the image capturing data to perform the object tracking mode, and sets the reference point anew.

2. The automatic object tracking system according to claim 1, wherein the handheld mobile device further comprises a third communication interface configured to receive a wireless signal that carries a tracking-start code and transfer the tracking-start code to the controller, to enable the controller to trigger the microprocessor by using the first communication interface and the second communication interface when the tracking-start code is received to start to perform the object tracking mode.

3. The automatic object tracking system according to claim 2, further comprising a remote control device, having:

a second encoding circuit, configured to generate the tracking-start code;

a fourth communication interface, electrically connected to the second encoding circuit; and a key group, electrically connected to the second encoding circuit, and configured to be pressed to trigger the second encoding circuit to drive the fourth communication interface to issue the wireless signal that carries the tracking-start code, so that the wireless signal is received by the third communication interface the tracking dock.

4. The automatic object tracking system according to claim 3, wherein when the key group is pressed to form a key combination, the second encoding circuit drives the fourth communication interface according to the key combination to issue the wireless signal that carries the tracking-start code.

5. An automatic object tracking method, applicable to a handheld mobile device and a tracking dock between which a communication link is established, wherein the handheld mobile device captures image capturing data in an image capturing direction by using an image capturing unit, generates a panning command, and transfer the panning command to the tracking dock, the tracking dock is configured to support the handheld mobile device, and receive the panning command to change the image capturing direction, and the method comprises the following steps:

triggering the handheld mobile device to perform an object tracking mode, and performing the object tracking mode on a feature object in the image capturing data;

defining a horizontal coordinate axis and a vertical coordinate axis that are perpendicular to each other in the image capturing data, defining a length of the image capturing data along the horizontal coordinate axis into a plurality of horizontal units, and defining a height of the image capturing data with respect to the horizontal coordinate axis into a plurality of vertical units;

when the feature object is recognized from the image capturing data, setting a sampling frame to surround the feature object, and setting a reference point in the sampling frame; and when a plurality of feature objects are recognized, setting a plurality sampling frames for the plurality of feature objects respectively, and performing the object tracking mode by using the sampling frame having a largest area in the image capturing data;

calculating a horizontal distance and a vertical distance between the reference point and a target coordinate;

wherein when the horizontal distance is larger than a horizontal threshold, issuing the panning command to change the image capturing direction, to move the reference point towards the target coordinate horizontally by at least one horizontal unit; and when the vertical distance is larger than a vertical threshold, issuing the panning command to change the image capturing direction, to move the reference point in the image capturing data towards the target coordinate vertically by at least one vertical unit; and continuously determining whether the feature object keeps within the image capturing data; when the feature object does not keep within the image capturing data, and the feature object is sheltered by another feature object, choosing the corresponding sampling frame of the another feature object to perform the object tracking mode, and setting the reference point anew; when the feature object does not keep within the image capturing data, and the feature object is not sheltered by another feature object, choosing another sampling frame having a largest area in the image capturing data to perform the object tracking mode, and setting the reference point anew.

6. The automatic object tracking method according to claim 5, wherein the step of triggering the handheld mobile device to perform the object tracking mode comprises:

receiving, by the tracking dock, a tracking-start code and transferring the tracking-start code to the handheld mobile device.

7. The automatic object tracking method according to claim 6, wherein the step of receiving, by the tracking dock, the tracking-start code comprises: receive a wireless signal and performing comparison to determine whether the wireless signal comprises the tracking-start code.

8. The automatic object tracking method according to claim 6, further comprising: receive a wireless signal and performing comparison to determine whether the wireless signal comprises a stop code, and triggering the handheld mobile device, when the wireless signal comprises the stop code, to disable the object tracking mode.

* * * * *